United States Patent Office 3,830,892
Patented Aug. 20, 1974

3,830,892
METHOD FOR MANUFACTURING A MOLDED ARTICLE OF EXPANDED VERMICULITE
Takeo Wada, Suita, Osaka, Japan, assignor to Takeda Chemical Industries, Ltd., Osaka, Japan
No Drawing. Filed Dec. 9, 1971, Ser. No. 206,497
The portion of the term of the patent subsequent to Aug. 21, 1990, has been disclaimed
Claims priority, application Japan, Dec. 29, 1970, 45/128,948
Int. Cl. C04b 31/22, 31/26
U.S. Cl. 264—25                               9 Claims

ABSTRACT OF THE DISCLOSURE

A new expanded vermiculite molded article is produced by a process which comprises subjecting vermiculite to heating or irradiation with electromagnetic waves in the presence of urea or thiourea and, during or after this process, allowing the vermiculite to contact with an aqueous solution of ammonium or alkali silicate.

---

The present invention relates to a method for manufacturing a molded article of expanded vermiculite, which comprises subjecting vermiculite to heating or irradiation with electromagnetic waves in the presence of urea or thiourea and, during or after this process, allowing the vermiculite to contact with an aqueous solution of ammonium or alkali silicate.

"Vermiculite" is a generic designation signifying mica-like minerals belonging to the mica group, and contains water of crystallization between its lamellas. Vermiculite has the property to expand when rapidly heated to a temperature beyond a certain critical level, which has been understood to be about 800° C., and thus expanded vermiculite can be used in widely varied industrial applications, such as architectural materials, heat insulators, packing materials, etc. by virtue of its light weight and heat-insulating and sound absorption properties.

The expanded vermiculite is usually obtained in the form of granules, and therefore, when the expanded vermiculite is used in the industrial applications as mentioned above, the granules are necessarily molded into the shape according to the respective objects. For this purpose, it has been proposed that a binding agent such as various synthetic resins (e.g. polyester resins, polyurethane resins, polyvinyl acetate resins, polyvinyl chloride resins, polyacrylic acid resins and so on) is mixed with the expanded vermiculite granules and the mixture is molded into the desired shape.

However, this known method is accompanied with fatal defects in an industrial point of view. Namely, since the expanded vermiculite shows a lamellar structure, most of the binding agent added is consumed in being absorbed into the lamellas without acting as a binding agent, and therefore quite a large amount of the binding agent must be used. Moreover, troublesome procedures are required for mixing the expanded vermiculite granules with a binding agent which is a very viscous material, and even if such procedure is employed, it is hardly possible to obtain a homogeneous mixture, which results in degradation of physical and mechanical properties characterized in the molded article of expanded vermiculite. Furthermore, during the mixing step, there often occurs collapse of the lamellar structure of the expanded vermiculite, which also results in degradation of the properties of the molded article.

Such being the technical state, it has been hitherto hardly possible to manufacture a molded article of expanded vermiculite having excellent properties by an industrially feasible process step.

Under the circumstances, for the purpose of providing a simple and industrially feasible method for manufacturing a molded article of expanded vermiculite, which has excellent properties, the present inventor has made extensive studies and reached a finding that a molded article of expanded vermiculite can be very easily prepared merely by allowing an aqueous solution of ammonium or alkali silicate to contact with expanded vermiculite which is prepared by subjecting vermiculite to heating or irradiation with electromagnetic waves in the presence of urea or thiourea. The present inventor has effected further study to make this finding more particular and concrete, that is, in the expanded vermiculite which is prepared by subjecting vermiculite to heating or irradiation with electromagnetic waves in the presence of urea or thiourea, there remains substantially no urea or thiourea as such but there contain a large number of (about 2 to 3 hundred) products which are produced by decomposition of urea or thiourea; although there are found melamine-like compounds or their intermediates in these decomposing products, clear and concrete chemical identification of all of the respective products is impossible, and it is reasonably assumed that there might contain unknown compound or compounds; when these decomposition products are allowed to contact with an aqueous solution of ammonium or alkali silicate, reaction or reactions among them proceed to bind strongly the expanded vermiculite granules with one another, though the mechanism of these reactions is not clarified.

On the other hand, it has been known that urea can be decomposed to give melamine only by contacting with ammonia atmosphere of remarkably elevated pressure in the presence of an acid and that methylol melamines can give cured resinous substances under heating in the presence of an acid, and it has further been known that an alkali metal silicate can coagulate by contacting with carbon dioxide under elevated pressure.

In view of these pieces of chemical knowledge so far known, it is quite unobvious and unexpected that urea would decompose to give many kinds of compounds including melamine-like compounds and their intermediates in vermiculite only by heating or irradiation with electromagnetic wave without addition of ammonia and without high pressure and that thus produced compounds would react with a water-soluble ammonium or alkali metal silicate in expanded vermiculite without addition of carbon dioxide to such an extent that the expanded vermiculite granules are strongly bound with one another by the act of the reaction products.

The present invention was accomplished on the basis of these unobvious and unexpected findings as mentioned above.

The principal object of the present invention is to provide a simple and industrially feasible method for manufacturing molded articles of expanded vermiculite.

Another object of this invention is to provide molded articles of expanded vermiculite which have excellent and useful properties and can be used in widely varied industrial applications.

The method which can realize the objects of the present invention comprises subjecting vermiculite to heating or irradiation with electromagnetic waves in the presence of urea or thiourea and, during or after this process, allowing the vermiculite to contact with an aqueous solution of ammonium or alkali silicate.

The following is detailed explanation of this method.

In accordance with the present invention, the process can be applied to unexpanded vermiculite as well as vermiculite material which is incompletely expanded by such a method as rapid heating or the treatment with hydrogen peroxide. Therefore, it is to be noted that the wording "vermiculite" is intended to include unexpanded vermiculite (i.e. vermiculite ore) and incompletely expanded vermiculite throughout the specification and claims.

Furthermore, the starting material of the present invention includes also a pre-treated vermiculite such as cation-exchanged vermiculite (e.g. a dyed vermiculite, $NH_4^+$-exchanged vermiculite, protonated vermiculite, metal cation-exchanged vermicuite such as $Na^+$-exchanged vermiculite and $Li^+$-exchanged vermiculite, etc.).

The protonated vermieulite is prepared for example by treating naturally occurring vermiculite with a mineral acid (e.g. hydrochloric acid, sulfuric acid, nitric acid, etc.). The metal cation- or $NH_4^+$-exchanged vermiculite is prepared by treating naturally occurring vermiculite with the corresponding ion.

The dyed vermiculite is prepared by *per se* known methods for example by treating vermiculite or a protonated vermiculite with color-forming cations or the corresponding color-forming molecule, which is capable of forming the color-forming cations with proton. Among the useful color-forming cations are transition metal ions and complex ions of metals with suitable ligands, mordant dyes or organic ammonium ions obtainable by adjusting the pH of dyes having primary to quaternary amino groups, and the like. As said transition metal ions, the ions of metals having atomic numbers from 22 to 29 and from 57 to 71 are usually employed. With regard to said color-forming metal complex ions, the combination of any of the metals which can be ions (for example, Fe, Mn, Co, Ni, etc.) with any of such ligands as water, ammonia, cyanide, molecules which are generally used in chelatometry, e.g. ethylenediamine, acetylacetone, pyridine, dipyridyl, 8-oxyquinoline, etc., and mordant dyes exemplified by alizarin, phthalocyanine, 4,4',4''-triaminotriphenylcarbinol, 1,4-diaminoanthraquinone, 4,4'-methylene bis(2-chloroaniline) or the like. The primary to quaternary amines which can yield color-forming ammonium cations are what are generally known as basic dyes, such as diamines having the aniline structure, e.g. phenylenediamine, benzidine, etc., and their derivatives; triphenylmethane type basic dyes having at least one amino group which are exemplified by malachite green and fuchsin; oxazine type basic dyes; xanthene type basic dyes such as rhodamine; azine dyes such as safranine; aminoanthraquinone dyes; and the like. Those species are employed to modify the color of the product.

As the method for treatment of vermiculite with the ion in order to give dyed vermiculite or metal cation- or $NH_4^+$-exchanged vermiculite, any known ion exchange means may be employed to advantage, insofar as the object will not be thwarted. More specifically, use may be made of the method in which the vermiculite is immersed in a solution of a salt of one of said ions in water or organic solvent (for example, acetone, alcohol or benzene) or the method of which said aqueous or organic solvent solution is circulated throughout the vermiculite. As regards the salts of ions mentioned above, the corresponding mineral acid salts such as hydrochloride, sulfate, nitrate, etc. or the corresponding organic acid salts such as acetate, formate, tartarate, oxalate, etc. may be used to advantage.

Thus $Mg^{2+}$ ions in vermiculite is replaced with the cations. While the ion exchange capacity of vermiculite with cations varies with different sources of vermiculite, it is not necessary to effect the replacement to full exchange capacity. The exchange is usually carried out to about 80 to about 200 milliequivalents/100 g. vermiculite. For example, the case of amine dyes having pronounced color-forming properties, sufficiently attractive colors are sometimes obtained when an ion exchange is carried out to 1/500 of the total ion exchange capacity.

While the size of vermiculite depends upon the use to which the final expanded vermiculite will be put, it is advisable to employ vermiculite in average size of from about 1 to about 10 millimeters, more desirably about 1 to about 8 millimeters in at least two dimensional directions.

Urea or thiourea or a mixture thereof may be employed in the form of an addition compound of the urea compound with a mineral acid (e.g. phosphoric acid, sulfuric acid, nitric acid, etc.), an organic acid (e.g. acetic acid, tartaric acid, malonic acid, etc.) or the salts of the mineral acid or the organic acid (e.g. calcium nitrate, sodium nitrate, magnesium sulfate, zinc chloride, sodium acetate, etc.) or in the form of an inclusion compound of the urea compound with normal paraffin (e.g. octane, decane, tetradecane, hexadecane, octadecane, etc.), alcohol (e.g. 1-octanol, 1-decanol, 1-hexadecanol, 1-octadecanol, etc.) or carboxylic acid (e.g. caprylic acid, n-capric acid, palmitic acid, stearic acid, etc.).

Practically, in the present method, vermiculite is at first impregnated with the urea compound. The impregnation is usually carried out by adding vermiculite into a melt of the urea compound, immersing vermiculite in a solution of the urea compound in an inert solvent or admixing vermiculite with a suspension or a paste of the urea compound. Such a solvent for the solution, suspension or paste is exemplified by water or an alkanol (e.g. methanol, ethanol or the like). When urea is employed as the urea compound, it is recommended to use urea in the form of a melt, and when thiourea or a mixture of urea and thiourea is employed as the urea compound, the use of a solution, a suspension or a paste thereof is recommended for the better result.

An amount of the urea compound to be impregnated is about 30 to about 200% by weight, more desirably about 50 to about 130% by weight, relative to vermiculite.

In case where the urea compound is employed in the form of a solution, a suspension or a paste, the concentration of the urea compound in the mixture (i.e. solution, suspension or paste) is not critical for the effect of the expansion of vermiculite. But, for the purpose of compact procedure and low production cost, the concentration of the urea compound falls in the range from about 10 to about 95 weight percent, preferably about 16.6 to 90 weight percent.

The mere contact of vermiculite with the melt or the mixture of the urea compound immediately causes impregnation of vermiculite with the urea compound to give a composition of vermiculite and the urea compound.

It may be possible to add an oxy acid salt, a mineral acid or an organic acid to vermiculite for the better result. The oxy acid salt includes oxyacid salts of Mg, Ca, Sr, Ba, etc., the mineral acid includes hydrochloric acid, sulfuric acid, phosphoric acid, etc., and the organic acid includes acetic acid, tartaric acid, etc. An amount of the acid salt or acid to be added is about 0.01 to about 0.2 mol/100 grams vermiculite. The addition is conducted at the same time with or after the treatment with the urea compound.

Thus treated vermiculite is then expanded. The expansion is attained by heating the vermiculite at a temperature of about 160 to about 500° C., most desirably around 220° C., for about 10 minutes to about 1 hour, or by irradiating the vermiculite with electromagnetic waves.

The electromagnetic waves to be employed according to this invention is usually a microwave or far infrared radiation and the frequency range that is useful is generally about 1 megacycle per second to about 10000 kilomegacycles per second, more preferably about 10 to about 10000 megacycles per second. The expression "MHz." has the same meaning as the expression "megacycles per second" and the former expression may be used instead of the latter.

The duration of irradiation usually ranges from about 0.0001 to about 30 minutes, though the proper time depends upon such factors as the frequency of the electromagnetic waves selected, the type and grain size of vermiculite to be irradiated, and the like.

The electromagnetic waves is supplied by any of per se known electromagnetic sources, e.g. an electronic range, high frequency welder or the like. The necessary power of the electromagnetic waves for the purpose should vary with other conditions such as the type, volume and grain size of vermiculite and the intended expansion degree. But it is usually in the range from about $10^{-6}$ kilowatt-hour to about 1 kilowatt.hour per gram of vermiculite.

The reaction vessel may be any kind of container if it is made of a material which is resistant to microwave or far infrared radiation and which features a low induction loss. More specifically, vessels made of polyethylene resin, various types of glass, silicon, phenolic resin, polyester resin, epoxy resin and nylon may be mentioned by way of example.

The above mentioned expansion of vermiculite may be conducted under pressure such as about 0.01 to about 70 kg./cm.$^2$.

According to the present method, (1) after the above expansion process is over, the resulting expanded vermiculite is allowed to contact with an aqueous solution of ammonium or alkali silicate. For this purpose, the aqueous solution is sprayed over the expanded vermiculite, or the expanded vermiculite is immersed into the aqueous solution. Alternatively, (2) during the expansion process, the vermiculite may be contacted with the aqueous solution of ammonium or alkali silicate. Namely, the vermiculite impregnated with the urea compound is treated with the aqueous solution by the method as mentioned in the above process (1) and then the resultant is expanded by the method mentioned above, or at the stage of impregnation of vermiculite with the urea compound, the aqueous solution of ammonium or alkali silicate may be allowed to contain in the melted urea compound or in the solution of the urea compound, and thus obtained vermiculite, which is impregnated with the urea compound and the silicate, is then subjected to expansion process.

The contact with the aqueous solution of ammonium or alkali silicate may be conducted under heating or cooling and/or under elevated pressure.

The aqueous solution of ammonium or alkali silicate of the present invention is shown by the formula of

$$mM_2O \cdot nSiO_2 \cdot qH_2O$$

wherein $m$, $n$ and $q$ are positive number and $m/n$ is higher than 0.005 but lower than 0.6 and $q$ is such number that the content of $SiO_2$ is 3 to 40 weight percent, and M is ammonium radical or alkali metal such as sodium, potassium and lithium.

The aqueous solution of ammonium or alkali silicate may be prepared after a conventional manner, for example, by a method comprising melting siliceous sand with alkali carbonate or hydroxide such as sodium carbonate and potassium hydroxide at 1200 to 1300° C. and then dissolving the resultant in water and, if desired, subjecting the resultant to ion-exchange with $NH_4^+$ radical, wherein amounts of the siliceous sand, the alkali carbonate or hydroxide and water are selected according to the desired ratio of $M_2O/SiO_2/H_2O$.

The aqueous solution of ammonium or alkali silicate may contain a small amount of impurities such as $Fe_2O_3$.

As the aqueous solution of ammonium or alkali silicate, use are most practically made of aqueous sodium metasilicate solution wherein $SiO_2$ content is 27.5 to 29 weight percent and $Na_2O$ content is 28.5 to 30 weight percent, so-called water glass wherein $SiO_2$ content is 23 to 38 weight percent and $Na_2O$ content is 6 to 18 weight percent, and commercially available aqueous solution of amorphous colloidal silica, wherein $SiO_2$ content is 15 to 31 weight percent and $Na_2O$ content is 0.02 to 0.6 weight percent.

Typical examples of the water glasses are that wherein $SiO_2$ content is 36 to 38 weight percent, $Na_2O$ content is 17 to 18 weight percent and $Fe_2O_3$ content is less than 0.05 weight percent (corresponding to Water Glass No. 1 of Japanese Industrial Standard, abbreviated as JIS), that wherein $SiO_2$ content is 34 to 36 weight percent, $Na_2O$ content is 14 to 15 weight percent and $Fe_2O_3$ content is less than 0.05 weight percent (corresponding to Water Glass No. 2 of JIS), that wherein $SiO_2$ content is 28 to 30 weight percent, $Na_2O$ content is 9 to 10 weight percent and $Fe_2O_3$ content is less than 0.03 weight percent (corresponding to Water Glass No. 3 of JIS) and that wherein $SiO_2$ content is 23 to 25 weight percent, $Na_2O$ content is 6 to 7 weight percent and $Fe_2O_3$ content is less than 0.03 weight percent (corresponding to Water Glass No. 4 of JIS). These water glasses can also be commercially available.

Typical examples of the commercially available aqueous solution of amorphous colloidal silica are Ludox-HS wherein $SiO_2$ content is 30.0 weight percent and $SiO_2/Na_2O$ is 95 by weight, Ludox-LS wherein $SiO_2$ content is 30.0 weight percent and $SiO_2/Na_2O$ is 285 by weight, Ludox-SM wherein $SiO_2$ content is 15.0 weight percent and $SiO_2/Na_2O$ is 155 by weight and Ludox-AM wherein $SiO_2$ content is 30.0 weight percent and $SiO_2/Na_2O$ is 230 by weight, these substances being manufactured and sold by Du Pont and Co., E. I., in USA under such trade names as above, and Snowtex-standard wherein $SiO_2$ content is 20 to 21 weight percent and $Na_2O$ content is less than 0.35 weight percent, Snowtex-30 wherein $SiO_2$ content is 30 to 31 weight percent and $Na_2O$ content is less than 0.6 weight percent, Snowtex-C wherein $SiO_2$ content is 20 to 21 weight percent and $Na_2O$ content is less than 0.2 weight percent, Snowtex-N wherein $SiO_2$ content is 20 to 21 weight percent and $Na_2O$ content is less than 0.02 weight percent and Snowtex-O wherein $SiO_2$ content is 20 to 21 weight percent and $Na_2O$ content is less than 0.02 weight percent, these substances being manufactured and sold by Nissan Chemical Industries Co., Ltd. in Japan under such trade names as above.

In the present method, any other aqueous solution of ammonium or alkali silicate may also be used so far as it falls within the above-mentioned general formula.

An amount of the aqueous solution of ammonium or alkali silicate to be used in the present method is about 0.1 to about 10 weight parts in terms of $SiO_2$ relative to one weight part of vermiculite.

The above process steps are preferably conducted using a mold corresponding to the desired shape.

Thus, the expanded vermiculite granules are bound strongly with one another by the act of the resulting product of the silicate with the decomposing materials of the urea compound, whereby there is manufactured a molded article of expanded vermiculite. For the better result, after the contact with the aqueous solution of ammonium or alkali silicate is completed, the resultant may be further heated or irradiated with electromagnetic waves under similar conditions to those as mentioned in the step for expansion of vermiculite.

In the production of the molded article of this invention, there may be incorporated into the vermiculite reinforcing materials such as rock wools, glass wools, glass fibers, asbestos, celluloses, wire-nettings, and the like, fillers such as clays, calcium carbonate, and the like, releasing agents such as zinc stearate, carbon black, titan white, chrome yellow, pigments, and other additives.

The shape of the molded article of this invention may be any of conventional ones such as sheet, board, pillar, block, tile, pile, etc. and the shape corresponding to the respective goods.

According to the present invention, molded article of expanded vermiculite can very easily be manufactured by quite simple process steps. The molded article of expanded vermiculite, which is prepared by the present method, retains excellent and interesting properties which are characterized in expanded vermiculite itself, such as light weight, sound absorption, heat insulation, ion exchangeability, humidity control property, water holding capacity, odor eliminating property, particularly ammoniacal odor eliminating property, attractive appearance, etc. Furthermore, among the abovementioned excellent properties possessed by the article of the present invention, ion exchangeability, humidity control property, high water holding capacity and odor eliminating property are hardly observed in a molded article of expanded vermiculite which is prepared by expansion after a conventional manner, i.e. rapid heating at not lower than about 800° C., but are peculiar to the molded article of the present invention which is prepared by combination of "expansion by heating at rather low temperature or by irradiation with electromagnetic waves, in the presence of urea or thiourea" with "contact with an aqueous solution of ammonium or alkali silicate."

Taking advantage of these excellent properties, the molded article of the present invention can be used in widely varied industrial applications such as architectural materials (e.g. floor boards, ceilings, wainscots, etc.), heat insulators, packing materials, mold for castings, etc. For instance, vermiculite is expanded and molded into sheets by the present method, the sheets are cut into a proper length and width, and thus shaped sheets are applied on floor, ceiling, wall, etc. after a conventional manner. As another instance, vermiculite impregnated with the urea compound is expanded, the expanded vermiculite granules are shaped in the desired mold for castings and then the silicate solution is sprayed over the mold to bind the molded granules with one another. Then, fused foundry pig iron is charged into the mold. After cooling, the resulting castings are taken out of the mold.

Following are illustrative examples of this invention, in which the term "parts" means "weight part(s)" unless otherwise noted and relationship between "weight part" and "volume part" is the same as that between "gram" and "milliliter."

Example 1

Into a glass vessel are charged 30 parts of vermiculite (about 3 millimeters square; sold by Parabora Mining Co., South African Republic), 16 parts of urea and 20 volume parts of water. The vessel is placed in a 500 watt electronic range of 2400 MHz. (manufactured by Matsushita Electric Company, Ltd. in Japan; NE 5500) for 24 minutes, whereby the vermiculite is expanded to about 300 volume parts.

35 Volume parts of aqueous solution of sodium silicate ($Na_2O$ content of about 10 weight percent, $SiO_2$ content of about 30 weight percent and water content of about 60 weight percent) is sprayed over the expanded vermiculite and the composition is, after standing for a while, placed in a circular iron molding frame (13 cm. diameter). The composition is then compacted by hand and heated at about 150° C. for 30 minutes. This procedure gives molded article of 1 cm. thick, 45 grams in weight and 0.35 in an apparent bulk density. No appreciable change is observed even after the molded article is immersed in boiling water for about 1 hour.

Example 2

A thick-walled glass container having an internal volume of 20 x 10 x 5 cm. is filled with 200 parts of hydrobiotite (about 5 millimeter square; produced in Ono-cho, Fukushima Prefecture, Japan), followed by the addition of 100 parts of urea and 50 volume parts of water. After thorough blending, the composition placed in a 500 watt electronic range of 2450 MHz. (manufactured by Matsushita Electric Company, Ltd. in Japan; NE 5500) for about 7 minutes, whereby the vermiculite is expanded to the capacity of the container.

200 Volume parts of aqueous solution of sodium silicate ($Na_2O$ content of about 10 weight percent, $SiO_2$ content of about 30 weight percent and water content of about 60 weight percent) and another 50 volume parts of water are sprayed over the expanded vermiculite, followed by standing for about 10 minutes. Then the composition is further placed in the same electronic range as above for 3 minutes. This procedure gives the molded article whose shape conforms to the interior contour of the glass container. This molded article has a bulk density of 0.35. The article is not deformed nor collapsed even after treatment with boiling water for 1 hour, followed by immersion in water for 1 week. Moreover, this article does not burn even when applied to the blue cone of a Bunsen Burner.

Example 3

500 Parts of hydrobiotite (about 7 millimeter square; produced in Ono-cho, Fukushima Prefecture, Japan) is mixed with 350 parts of urea and 250 volume parts of water. The mixture is passed through an oven heated at 220° C. at a rate of 20 parts/min., whereby the hydrobiotite is expanded to 450 volume parts.

The expanded hydrobiotite is put in a mold (30 cm. x 60 cm. x 2 cm.) and 500 volume parts of Snowtex-C (aqueous solution of amorphous colloidal silica, $Na_2O$ content of 0.2 weight percent, $SiO_2$ content of 20.5 weight percent, manufactured and sold by Nissan Chemical Industries Co., Ltd., Japan) is sprayed, followed by keeping under slight press. The resultant is then heated at 100° C. for about 30 minutes to give a molded board.

Example 4

Into a glass vessel are charged 100 parts of vermiculite (about 2 millimeter square; sold by Parabora Mining Co., South African Republic), 70 parts of urea and 20 volume parts of water. The vessel is heated at 220° C., whereby the vermiculite is expanded to about 12,000 volume parts.

Over the expanded vermiculite is sprayed 210 parts of aqueous solution of potassium silicate ($K_2O$: 11 parts, $SiO_2$: 34 parts, $H_2O$: 165 parts). Thus treated vermiculite is put in a pipe-cover-like mold frame (capacity: 700 $cm.^3$), followed by heating at 150° C. for about 30 minutes. This procedure gives a pipe-cover-like molded article of expanded vermiculite which shows a bulk density of 0.17. When the article is immersed in 2N aqueous cobalt chloride solution for 1 hour at 80° C., the article is colored reddish purple without collapse of its shape.

What is claimed is:

1. A method for manufacturing a molded article of expanded vermiculite in a mold corresponding to the desired shape which comprises filling said mold with a mixture of urea or thiourea in molten form or in solution and vermiculite, subjecting said mixture to heating for about 10 minutes to about 1 hour at a temperature of between about 160° C. and about 500° C. or to irradiation for about 0.0001 to about 30 minutes with electromagnetic waves wherein the frequency of said waves is above 1 megacycle per second to about 10,000 kilomegacycles per second, and during or after this process, spraying the vermiculite with an aqueous solution of ammonium or alkali silicate or immersing the vermiculite into the aqueous solution of ammonium or alkali silicate or before this process, impregnating the vermiculite with the aqueous solution of ammonium or alkali silicate, which is contained in the melted urea or thiourea or in the solution of the urea or thiourea, the aqueous solution of ammonium or alkali silicate having the formula

$$mM_2O \cdot nSiO_2 \cdot qH_2O$$

wherein $m$, $n$ and $q$ are positive numbers and $m/n$ is higher than 0.005 but lower than 0.6 and $q$ is such number that the content of $SiO_2$ is 3 to 40 weight percent and M is the ammonium radical or alkali metal, the amount of aqueous solution of ammonium or alkali silicate being about 0.1 to about 10 weight parts in terms of $SiO_2$ relative to one weight part of vermiculite, the amount of urea or thiourea being 30 to 200 weight percent relative to the vermiculite.

2. A method as claimed in claim 1, wherein (1) vermiculite is impregnated with urea or thiourea, (2) thus treated vermiculite is heated or irradiated with electromagnetic waves, and (3) during or after the process (2), the vermiculite is allowed to contact with an aqueous solution of ammonium or alkali silicate.

3. A method as claimed in claim 1, wherein vermiculite is impregnated with urea or thiourea, thus impregnated vermiculite is heated or irradiated with electromagnetic waves, and then thus treated vermiculite is allowed to contact with an aqueous solution of ammonium or alkali silicate.

4. A method as claimed in claim 1, wherein vermiculite is impregnated with urea or thiourea and with an aqeous solution of ammonium or alkali silicate, in this order or at the same time, and thus impregnated vermiculite is heated or irradiated with electromagnetic waves.

5. A method as claimed in claim 1, wherein the aqueous solution of ammonium or alkali silicate is water glass in which $SiO_2$ content is 23 to 38 weight percent and $Na_2O$ content is 6 to 18 weight percent.

6. A method as claimed in claim 1, wherein the aqueous solution of ammonium or alkali silicate is an aqueous solution of amorphous colloidal silica in which $SiO_2$ content is 15 to 31 weight percent and $Na_2O$ content is 0.02 to 0.6 weight percent.

7. A method as claimed in claim 1, wherein an amount of urea or thiourea is 50 to 200 weight percent relative to vermiculite.

8. A method as claimed in claim 1, wherein M is alkali metal.

9. A method as claimed in claim 1, wherein M is Na or K.

References Cited

UNITED STATES PATENTS

| | | | |
|---|---|---|---|
| 1,693,015 | 11/1928 | Babor et al. | 106—75 |
| 2,564,978 | 8/1951 | Hyde et al. | 106—41 |
| 3,619,435 | 11/1971 | Kepper | 106—40 |
| 3,118,658 | 1/1964 | Dennert | 252—378 R |
| 3,753,923 | 8/1973 | Wada | 252—378 R |
| 3,758,415 | 9/1973 | Wada | 252—378 R |

FOREIGN PATENTS

| | | | |
|---|---|---|---|
| 1,167,798 | 10/1969 | Great Britain | 252—378 R |
| 1,059,832 | 2/1967 | Great Britain. | |

DANIEL E. WYMAN, Primary Examiner

P. E. KOHOPKA, Assistant Examiner

U.S. Cl. X.R.

106—Dig. 003, 38.35, 84; 204—157.1 R; 252—378 R; 264—22, 110; 161—162, 168, 208